United States Patent [19]
Holm et al.

[11] Patent Number: 4,788,919
[45] Date of Patent: Dec. 6, 1988

[54] FLUIDIZED BED REACTOR AND PROCESS FOR THE OPERATION OF A FLUIDIZED BED REACTOR

[75] Inventors: Ejler L. Holm, Gistrup; Jens C. Clausen, Storvorde, both of Denmark

[73] Assignee: Aalborg Vaerft A/S, Aalborg, Denmark

[21] Appl. No.: 870,977

[22] Filed: Jun. 5, 1986

[30] Foreign Application Priority Data

Jun. 13, 1985 [DK] Denmark ............................ 2688/85
May 23, 1986 [DK] Denmark ............................ 2425/86

[51] Int. Cl.$^4$ ............................................ F23D 1/00
[52] U.S. Cl. .................................... 110/347; 110/245; 110/263; 122/4 D
[58] Field of Search .................... 110/233–235, 110/243–245, 263, 344–347, 203–206, 216; 165/104.16; 34/10, 57 A; 432/15, 58, 215; 431/7, 170; 122/4 D

[56] References Cited

U.S. PATENT DOCUMENTS

| | | | |
|---|---|---|---|
| 4,084,545 | 4/1978 | Neck et al. | 110/347 X |
| 4,103,646 | 8/1978 | Yerushalmi et al. | 122/4 D |
| 4,111,158 | 9/1978 | Reh et al. | 122/4 D |
| 4,165,717 | 8/1979 | Reh et al. | 122/4 D |
| 4,303,023 | 12/1981 | Perkins et al. | 122/4 D X |
| 4,321,233 | 3/1982 | Tsuji et al. | 431/170 X |
| 4,349,354 | 9/1982 | Flesch | 110/234 X |
| 4,419,965 | 12/1983 | Garcia-Mallol et al. | 431/170 X |
| 4,424,766 | 1/1984 | Boyle | 110/245 X |
| 4,473,033 | 2/1984 | Strohmeyer, Jr. | 122/4 D |
| 4,538,549 | 9/1985 | Stromberg | 110/245 X |
| 4,580,503 | 4/1986 | Astrom | 110/216 |
| 4,594,967 | 6/1986 | Wolowodiuk | 122/4 D |

FOREIGN PATENT DOCUMENTS

102008 6/1983 Japan ............................ 110/205
WO81/01873 7/1981 World Int. Prop. O.

*Primary Examiner*—Steven E. Warner
*Attorney, Agent, or Firm*—Fleit, Jacobson, Cohn & Price

[57] ABSTRACT

Fluidized bed reactor and a process for the operation of a circulating, fluidized bed reactor, by which a solid particle material, in particular carbonaceous fuel, is introduced into the lower part of the reactor and is formed to a fast bed by a fluidization gas containing a gaseous reactant material, in particular oxygen, introduced into the reactor bottom, while non-reacted particles are removed from the reactor top and recirculated to the bed. By removing a predetermined fraction of the solid particle material in the reactor from at least one site positioned below the reactor top, subjecting it to thermal treatment and recirculating it to at least one other, lower positioned site of the bed, enhanced possibilities for process optimization are achieved.

12 Claims, 2 Drawing Sheets

FLUIDIZED BED REACTOR AND PROCESS FOR THE OPERATION OF A FLUIDIZED BED REACTOR

The present invention relates to a fluidized bed reactor and to a process for the operation of such reactor.

Fluidized bed systems are used in connection with a number of processes wherein good contact is contemplated between a solid particulate material and a gas. Typical examples are heat-exchange processes, heterogeneously catalyzed reactions, and direct reactions between solids and gases. In recent years, fluidized bed systems have gained particular interest in connection with plants for the combustion of solid fuels. The reason therefor is to be found in particular in the environment problems which conventional combustors give rise to, as in such combustors it is costly and complicated to avoid unacceptable air pollution, in particular due to sulphur dioxide ($SO_2$) and nitrogen oxides ($NO_x$).

The process and the reactor of the present invention are in particular well suited in connection with plants for the combustion of solid fuels, but they also provide advantages in all such cases where there is a need of heating or cooling a bed material, including such cases where a solid material which is on particular form, or can be brought on such form, is to react exothermally or endothermally with a gas.

Fluidized bed systems are divided on basis of the kind of fluidization into three types, i.e. the "bubble bed" type, the "turbulent bed" type, and the "fast bed" type. In the two first mentioned types the velocity of the fluidization gas is so low (typically 1–3 m/sec.) that the solid reactor material essentially remains in the bed which is therefore also called a "slow bed". In a fast bed the velocity of the fluidization gas is higher (typically >6 m/sec.) than the terminal velocity of the solid reactor material which means that the bed particles aare being carried away with the gas flow and transported out of the bed. In fast beds the bed particles are therefore recirculated, and for such systems also the term "circulating beds" is used. It is furthermore characteristic of such systems that the particles are distributed with decreasing density in the reactor flow direction until the flow condition may be regarded as particle transportation only.

When systems with fast fluidized bed or circulating bed are utilized in a combustion process, only up to about 5% of the particle mass will consist of fuel, whereas the remainder will be inert material, in particular sand, ashes and sulphur absorbant. In such a system it is necessary to cool the bed particles, as otherwise so high temperatures would be created that these particles would sinter. Such cooling may be effected by cooling the reactor walls or by means of built-in boiler tubes in the reactor, cf. f. ex. U.S. Pat. No. 4,084,545. Another possibility for cooling is that the circulating particle material is cooled in an external particle cooler before it is returned to the reactor, cf. f. ex. published international Application No. PCT/US80/01737. It is also possible to combine these two cooling systems. However, none of these solutions are satisfactory as they make it difficult to realize optimal operation. By using only cooling surfaces or boiler tubes in the reactor, there will be an ununiform temperature distribution in radial direction over a reactor cross-section, in particular in the case of a cooled reactor wall, and it will therefore not be possible to optimalize the course of the process. Moreover, the cooling effect of such internal cooling surfaces is almost constant, independent of other operation parameters of the system which gives inferior regulation possibilities, and consequently inferior possibilities of optimalization. By using external cooling of circulating reactor material, the very fact that a large assembled mass of particles constantly is to be cooled will limit the fluidization speed. Furthermore, external cooling limits reactor pressures which can be used. A high reactor pressure is particularly desirable, because the release of effect from the reactor at a certain fluidization speed increases rapidly with increasing pressure.

It is furthermore to be understood that a circulating bed has a relatively long starting period due to the large mass of partly inert material and partly fire-proof linings.

The present invention provides a process of operating a fast fluidized bed reactor as well as a compact fluidized bed reactor, which in proportion to the above-mentioned prior art of fast beds gives substantially improved possibilities of process optimalization, including operation at increased pressures. When the present invention is used in connection with a combustion process, this process proceeds separate from the heat transmission. Particular advantages are obtained in connection with desulphurization, and due to the improved possibilities of process optimalization, control of the contents of $NO_x$ in the combustion gas is facilitated. Furthermore, the invention provides advantages in connection with starting of a reactor. Other advantages will appear from the following description.

In the process aspect of the invention it relates to a process of operating a circulating fluidized bed reactor, in which process a solid particle material comprising a solid reactant is fed into the lower part of the reactor and formed into a fast bed by means of fluidization gas containing a gaseous reactant, being introduced into the lower part of the reactor, whereas non-reacted particles are removed from the upper part of the reactor and recirculated to the bed. This process is characterized in that a predetermined fraction of the solid particle material being present in the reactor is removed from at least one site positioned below the top of the reactor, is subjected to a thermal treatment, and is recirculated to at least one lower site of the bed.

By means of this process any number of separate circuits are established, by means of which it is possible to remove a predetermined amount of solid particle material, cool or heat this material, and return it to one or more lower positioned sites in the bed. The expression "a fraction" as used here and in the following is to be understood as an amount which is smaller than the total amount of material being present at any time in the part in question of the bed. Although the most important area of utilization of the invention is in a combustion process, it is to be understood that it will just as well be possible to cool a fraction of a solid material in any other exothermal reaction, just as it will be possible to supply external heat in an endothermal reaction.

As the solid reactant for the process of the invention any such material can be used which can be brought on a suitably finely divided form for fluidization. In case of a combustion process, the solid reactant will be provided by the fuel, and it will typically be coal, including lignite or anthracite, but also other carbonaceous materials may be used, such as bio mass, refuse, wood, peat, and petro coke. The degree of comminution of the fuel is not critical and may typically vary from 0 to about 40 mm, in particular from about 0 to about 10 mm. The fuel may be introduced in any mixture with inert particle material, f. ex. sand, and may also be introduced as a suspension in water, i.e. as a paste or slurry. Typically, 2-5% of the solid material in the reactor will be fuel, and the remainder will be inert particulate material, including sulphur absorbant.

Coal contains varying amounts of sulphur, dependent upon the origin, typically in the order of 1-3% sulphur. Desulphurization in combustion processes is normally performed by calcinating limestone under evolution of carbon dioxide whereafter the formed calcium oxide reacts with sulphur dioxide and oxygen to give calcium sulphate. The calcination process is endothermal, whereas the formation of calcium sulphate is exothermal. It has been found that it is possible to take particular advantage of these conditions in the process of the present invention as the necessary heat energy for calcinating the limestone can be provided by the circulating fraction(s) of solid material from the bed, why limestone advantageously may be introduced for direct mixture with a circulating solid particle material at a site where particles are removed for thermal treatment. Hereby the limestone is calcinated in an area where the partial pressure of carbon dioxide is low, even by operating the reactor at increased pressure, whereby a high degree of calcination is obtained. In the following reaction between calcium oxide and sulphur dioxide, useful heat is developed, and the formed calcium sulphate may be separated after need from the flue gas.

As the fluidization gas in the process of the invention, any gas may be used which contains a gaseous reactant. In a combustion process, the fluidization gas is air which is introduced partly as primary air, and partly as secondary air. The primary air is preferably introduced in an amount corresponding to combustion of volatile substances and oxidation of carbon to carbon monoxide, and moreover in dependence of the solid charge.

As mentioned above, in the process of the invention, a system with fast fluidized bed or circulating bed is to be established. In practice, this may be obtained by introducing the fluidization gas, in particular primary air, into the lower part of the reactor at a velocity being dependent on the particle size distribution, preferably between 0.4 and 3 m/sec., typically between 0.6 and 2.0 m/sec., whereby initially a bubbling or turbulent bed is established. From the surface area of this bed a part of the particles is "flushed out" by means of the fluidization gas, preferably particles of a size less than 2000$\mu$, and typically less than 300$\mu$, whereafter the raised particles, possibly by means of introduced secondary air, are carried away with the fluidization gas, preferably in an amount from 5 to 300 kg/m$^2$/sec., typically 15-70 kg/m$^2$/sec. These particles are then conveyed up through the reactor as a fast bed.

The magnitude of each separated predetermined fraction is preferably 30 to 70% by weight of the amount of particles in the corresponding reactor cross section, and this amount is recirculated after thermal treatment and possible supply of further particles, to one or more lower sites in the bed. The amount of particles introduced at a lower site in the bed may be the same as separated above, but is typically 30 to 70% by weight of the amount of particles in the reactor cross section, where it is being introduced into the bed. Larger amounts of particles may also be introduced into the bed, if it is desired to obtain an accumulation of particles downwards in the reactor system. Such an accumulation of particles which will be unstable, will usually occur when the charge is lowered and the amount of air in view hereof is decelerated.

The magnitude of each separated predetermined fraction is moreover determined in relation to the reactor volume so that operation is stable at a given total amount of particles and gas velocity. When the amount of solid reactant being introduced into the lower part of the reactor per time unit is changed, there should also be made a change in the velocity of the fluidization gas, so that a new stable condition is obtained. In case of a combustion process where the charging rate is increased, the amount of primary air is slowly increased, typically to an amount of air which is 1.1 to 1.3 times the amount of air corresponding to stable operation with the charge in question. When the new point of stability has been reached, the primary air is regulated to correspond with the operation level. If the charging rate is lowered, the amount of primary air is correspondingly slowly reduced, again typically to between 1.1 and 1.3 times the amount of air corresponding to stable operation, until a new equilibrium condition has been reached, and then the primery air is regulated to correpond with operation level. The amount of air during acceleration and deceleration may in practice be controlled as a function of the amount of volatile substances in the solid reactant, in particular by controlling the amount of secondary air.

The amount of secondary air may in practice be controlled by means of oxygen measuring equipment in the flue gas before this is expelled to the atmosphere. Regulation of the secondary air is performed in such a manner that a change from turbulent bed to circulating fast bed is secured, and at the same time oxidation of carbon monoxide to carbon dioxide and remaining oxidation of volatile sulphur oxide to $CaSO_4$ takes place.

Fossile $NO_x$ is reduced to nitrogen by hydrocarbons from the fuel being present in the turbulent zone and may be further reduced by introducing $NH_3$, in particular with the secondary air.

During stable operation, and in particular decelerating operation, it is possible to keep the combustion process at a point of equilibrium just below or just above the theoretically necessary amount of air. It is hereby possible to obtain less than 200 ppm of $SO_x$, 200 ppm of $NO_x$, and 20 ppm of $CO_x$, in the flue gas during operation at atmospheric pressure, by adding desulphurizing material in a mole ratio of from 0 to 2.5, typically 1.2. By operation at increased pressure, these values may be lowered further. Under preferred conditions no amount, or neglible amounts, of detrimental polyaromatic hydrocarbons are measured in the flue gas.

In another aspect, the invention provides a fluidized bed reactor comprising a vertical reactor chamber, a first inlet into the lower part of the reactor chamber for introduction of solid particle material and a second inlet into the lower part of the reactor chamber for introduction of fluidization gas, and an outlet conduit in the upper part of the reactor chamber for removal of reactor material, said reactor being characterized in that at least one further outlet conduit for solid particle material is provided between said first inlet for solid particle material and said outlet conduit for reactor material, said further outlet conduit via cooling or heating members leading back to the reactor as at least one further inlet for solid particle material.

Such reactor is suitable for performing the process of the invention described above, whereby the further outlet conduit or conduits makes it possible to remove predetermined fractions of solid particle material, to control heating or cooling thereof, and to return the particle material treated in this manner to one or more lower positioned sites of the bed, and to prolong residence time of the particle mass in the bed.

In a preferred embodiment of the reactor according to the invention the further outlet conduits(s) for particle material comprise one or more extensions on the reactor chamber. In the thus extended part of the reactor a heat exchanger for heat-exchange with the discharged solid particle material may be provided, so that the desired thermal treatment may be obtained by means of such a heat exchanger. Alternatively, the solid particle material may be conveyed to an external thermal treatment unit, f. ex. a heat-changer, and therefrom back to the reactor.

While the fluidization gas with fluidized solid particles passes a reactor extension, the fluidization velocity is automatically decreased in the outermost part of the bed along the reactor wall. The change of fluidization velocity is approximately inversely proportional to the square on the change of the reactor cross section, so that a doubling of the reactor cross section reduces the fluidization velocity by ¼. It will be appreciated that by suitable configuration of the reactor extension, the fluidization velocity may be decreased to the extent that the largest particles as well as particle accumulations of smaller particles may sink due to gravitational effect, whereby they are conveyed from the bottom of the reactor extension through the mentioned outlet conduit to a lower site of the bed. The outlet conduit is provided with suitable valve members by means of which the amount of recirculated solid particles may be controlled. Besides, the sinking particles may in the extended part of the reactor be refluidized by introduction of supplementing gas, such as secondary air or recirculated flue gas, whereby the extended part of the reactor may act as a bubble bed. Furthermore, inlets for solid additive material may be provided in the extended reactor sections, including desulphurizing material, which may typically be limestone as explained above.

A reactor according to the invention may comprise an arbitrary number of reactor extensions with appertaining conduits for thermal treatment and return of fractions of particle material to the reactor. As the elaboration of the mentioned reactor extensions with appertaining conduits adds to the costs of the reactor, it will normally be made with the least possible number of extensions, preferably not more than 3, in particular only 2, and most preferred only 1 reactor extension. For supplemental thermal treatment of solid particle material a further unit for thermal treatment may be provided in the outlet end of the reactor chamber or in the last reactor extension; this unit may in particular be a fluidized bed cooler with outlet tube for accumulated solid material or a heat-exchanger, in particular a cooling spiral. A cooling spiral positioned at the top of a reactor will normally be exposed to hard wear, but in the reactor according to the present invention a large amount of the particles will be removed in preceding separators, and the particle velocity will be strongly decreased. Consequently, a cooling spiral will not be exposed to any substantial wear (erosion) in the present case. The temperature for gas and particles may in the bed cooler or cooling spiral be lowered to a temperature permitting the use of cyclones of usual carbon steel, whereby inappropriate fire-proof linings are avoided.

The part of the solid reactant material which does not attain reaction in the reactor is together with inert particle material, ashes and the like, by means of the outlet gas expelled through the outlet conduit in the upper part of the reactor chamber, and the solid particles may hereafter in a manner known per se be segregated by means of a particle segregator, in particular a cyclone. The recovered solid particles may then be conveyed from the bottom of the cyclone to a depot or be returned to the reactor, preferably through one or more inlets, to the fractions of particulate material removed from the reactor. The reactor may in its upper part be provided with a plurality of particle segregators, and in such case these may be positioned as cyclones symmetrically around the reactor, f. ex. two diametrically opposite cyclones. Both in the case of only one cyclone being provided, and in particular in the case of a plurality of cyclones, the outlet conduit(s) for solid particles from the reactor may be entered through the side of the reactor in its upper part, a small part of the conduit(s) projecting into the reactor to avoid, to the extent possible, that particles of sand be drawn into the cyclone(s).

The process of the invention may be carried out at normal atmospheric pressure, but, as mentioned above, a high reactor pressure is specifically desirable, because this permits an increased effect release. For operation at increased pressure the purified flue gas may actuate a turbo-charger which in turn may compress the gaseous reactant material, such as atmospheric air, to the desired operation pressure which preferably will be between 1 and 3.5 bara or above 12 to 16 bara.

During start-up or operation under atmospheric pressure, the turbo-charger is disengaged or left out, and the air supply is provided or kept going by means of an air compressor, which may typically be electrically driven.

For heating or preheating of the gaseous reactant a boiler may be used during the starting period, which boiler may typically be gas or oil heated. By a combustion process this start boiler will be coupled into the primary air circuit and heat or preheat the air until the process is running or at the desired temperature, whereafter the solid fuel may be dosed into the reactor for further heating. The start boiler is coupled out or is only used as air preheater, typically from 650° C., until operation temperature has been reached.

The process and the reactor according to the invention are illustrated in the following with reference to the drawings, in which

DETAILED DESCRIPTION OF THE PREFERRED EMBODIMENTS

Figure 1:
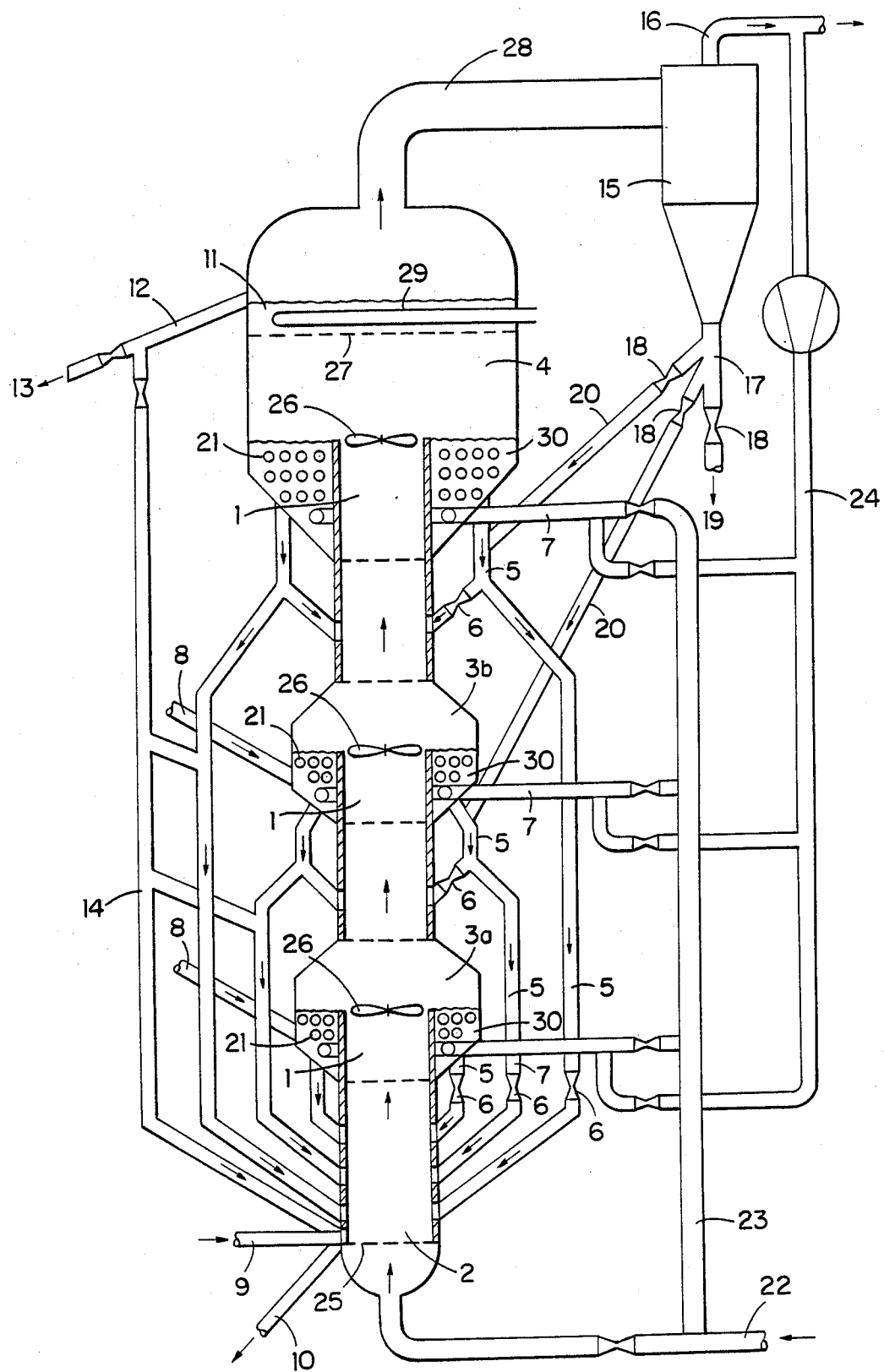
FIG. 1 shows an embodiment of a reactor according to the invention with three reactor extensions.

The reactor shown in FIG. 1 consists of a generally cylindrical reactor chamber 1 comprising a bottom chamber 2, intermediary reactor extensions 3a and 3b as well as an uppermost reactor extension or top chamber 4. The reactor extensions 3a, 3b, and 4 communicate via any number, typically from 1 to 12 in 1 to 6 levels, of down-flow pipes 5 having regulation valves 6, with respective lower positioned parts of the reactor. The regulation valves 6 may be L-valves, mixing regulators or the like for regulation of the particle flow. Reference numeral 7 designates inlets for secondary air into the bottom of each reactor extension. Additive material, including desulphurizing material, may through conduits 8 be introduced into the reactor extensions 3a and 3b, while the primary solid reactant material, f. ex. fuel and the inert particle material, may be supplied through a tube 9 entered through the bottom chamber 2. Solid material may, if desired, be removed through a tube 10 in the bottom chamber 2.

In the embodiment shown, a fluidized bed cooler 11 is indicated in the top chamber 4, wherefrom accumulated material may be removed through an outlet tube 12, either to a depot 13 or to the bottom chamber 2 via tube 14. Reference numeral 15 shows a cyclone with gas outlet tube 16 and bottom outlet tube 17, which via branchings with appropriate valves 18 lead to the depot 19, or via tubes 20 to down-flow pipe 5. In the reactor extensions 3a, 3b, and 4 reference numeral 21 indicates the tubes for a heat-exchanger with heat-exchanger medium being introduced from outside. Finally, the reactor is at the bottom provided with an inlet tube 22 for fluidization gas, which tube has a branch 23 for the supply of secondary air through the already mentioned inlets 7 to the bottom of the respective reactor extensions 3a, 3b, and 4. Supplementing gas passing through the inlets 7 may be led from the outlet gas from the cyclone 15 via outlet conduit 16, a turbo-charger, and a branched conduit 24. All the shown tubes may, irrespective of whether this is shown or not, be provided with appropriate valve arrangements permitting regulation of all transported amounts.

The mode of operation of the shown reactor will now be explained with reference to a combustion process.

Primary air is in an amount of 50 to 100% of the total amount necessary for a combustion process led through the tube 22 via nozzles 25, shown with a dashed line, into the bottom chamber 2. Suitable particulate solid fuel, inert material, and possibly desulphurizing material, are, either together or separately, conveyed through the inlet 9 to the bottom chamber 2, whereby a fluidized bed is formed. After a given length of passage in the reactor chamber 1, gas and solid particles pass the first reactor extension 3a, where a predetermined part of the reactor material is removed. This removal may be caused already by the decreased fluidization velocity by gravitational effect, but may also be furthered by means, in principle indicated by reference numeral 26. These means may be pneumatic, mechanic or electric. The amount of material removed from the reactor extension 3a is determined by the amount which can pass through the down-flow pipe 5 after cooling by means of the heat-exchanger 21. Secondary air from tube 23 or recirculation gas from tube 24, or a mixture thereof, may through tube 7 be led to the bottom of the reactor extension 3a and thereby form a fluidized bed 30, which typically may be a bubble bed. In a preferred embodiment of the invention desulphurizing material is supplied to such a bed through the inlet 8.

After the first separation step via the reactor extension 3a, the gas and the non-separated part of the bed material, and possibly recirculated bed material from superjacent separation steps, are together with the secondary air introduced through 7 or recirculated gas, conveyed to the next reactor extension 3b. The material is here subjected to a second separation step after the same principle as the separation step in connection with the reactor extension 3a. From this second separation step the cooled bed material is recirculated to the reactor bottom or to another selected site of the reactor.

From the second separation step the gas, with bed material, is conveyed to the top chamber 4, where the bed material is subjected to cooling after the same principles as in the reactor extensions 3a and 3b. In addition hereto the bed material may be cooled by means of the fluidized bed cooler 11, through nozzles 27 of which gas and the remaining part of bed material are passed. Accumulated material in the bed cooler 11 is removed through branched conduit 12 and led to the depot 13 or returned to the bottom chamber 2. Alternatively, cooling may be carried out by means of a cooling spiral 29, or supplementing cooling may be carried out by means of such cooling spiral.

The outlet gas, together with remaining bed material, is from the reactor top via outlet conduit 28 led to the cyclone 15, where the gas is purified for the end purpose, and the separated material is discharged through the conduit 17 and recirculated to the reactor 1 or conveyed to the depot 19.

By starting up of the reactor it is possible, by appropriate controlling measures, to stop the bed at the first reactor extension 3a and thereby achieve a faster starting period on a smaller amount of particle material.

Figure 2:
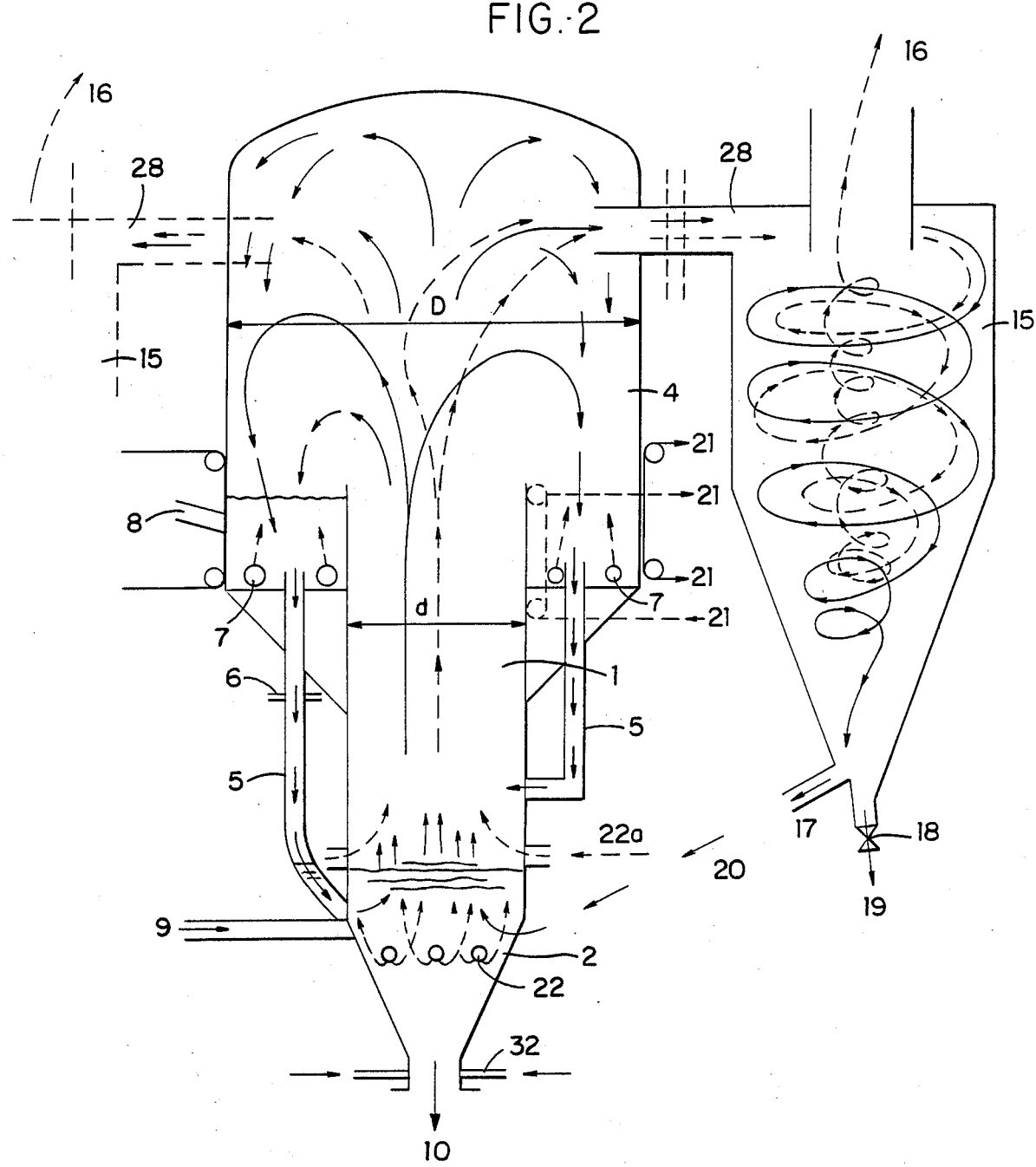
FIG. 2 shows a corresponding reactor according to the invention with one reactor extension and under operating conditions.

FIG. 2 shows another embodiment of a reactor according to the invention, wherein the reference numerals correspond to those of FIG. 1. This embodiment has only one reactor extension 4, and in proportion to FIG. 1 certain changes have been made with respect to the tubing arrangement. The conduit 10 is thus for possible removal of solid material positioned centrally in the bottom, supplementing fluidization gas may be introduced into the conduit 10 via tubes 32; a number of nozzles 22 are arranged in the lower part of the reactor for introduction of primary air, a supplementing conduit 22a for introduction of secondary air, and the outlet conduit 28 is by means of a connecting piece entered into the side of the upper, extended part 4 of the reactor. Furthermore, a dashed line indicates a possible additional cyclone 15 with outlet conduit 16. The diameter of the actual reactor 1 is designated d, and the diameter of the extended reactor part is designated D. The gas circuit is indicated by means of dotted lines and arrows, while the particle circuit is indicated with full-drawn lines and arrows.

We claim:

1. In a continuous process for the operation of a circulating, fluidized bed reactor, by which a solid particle material including a solid reactant material is introduced into a lower part of the reactor and is formed into a fast bed by means of a fluidization gas containing a gaseous reactant material introduced into the lower part of the reactor, while any non-reacted particles of said solid reactant material are continuously discharged from an upper part of the reactor and recirculated to the bed, a predetermined fraction of said solid particle material being present in the reactor is removed from at least one site of the bed positioned below said upper part of the reactor, is first subjected to substantial thermal teatment by being brought into heat-exchanging contact with heat-exchanging means in a space peripheral to the reactor, said space having confinements forming an integral part of the reactor, and said predetermined fraction including any unreacted solid particle material is then directly recirculated by continuous free gravitational fall to at least one lower positioned site of the reactor.

2. A process according to claim 1 wherein said solid material in the outlet gas of the reactor is recirculated for mixing with a removed fraction of solid particle material.

3. A process according to claim 1, wherein the process is carried out at atmospheric or increased pressure, preferably from abt. 1 to abt. 3.5 bara or above 12–16 bara.

4. A process according to claim 1, wherein supplementing gaseous reactant material is added to a removed fraction of solid particle material.

5. A process according to claim 1, in which the solid reactant material is a carbonaceous fuel, that the gaseous reactant material is oxygen, and that the thermal treatment is a cooling.

6. A process according to claim 5, in which a desulphurizing material, preferably limestone, is added in connection with the cooling of a removed particle fraction.

7. A process according to claim 1, wherein there are two lower positioned sites of the reactor.

8. A process according to claim 7, wherein said two lower positioned sites of said reactor are located one above the other.

9. A process according to claim 1, wherein said substantial thermal treatment is performed by establishing fluidized bed in said space.

10. A process according to claim 9, wherein said fluidized bed is a bubble bed.

11. A process according to claim 1, wherein said solid particle material includes an inert particulate material, said inert particulate material being introduced into said lower part of the reactor with said reactant material and is removed as part of said predetermined fraction.

12. A process according to claim 11, wherein said inert particulate material is sand.

* * * * *